(12) United States Patent
Diao et al.

(10) Patent No.: US 11,498,659 B2
(45) Date of Patent: Nov. 15, 2022

(54) MULTIROTOR AERIAL VEHICLE WITH AUTOMATICALLY ROTATABLE ARMS

(71) Applicant: Purdue Research Foundation, West Lafayette, IN (US)

(72) Inventors: Xiumin Diao, West Lafayette, IN (US); Jin Hu, Cleveland, OH (US)

(73) Assignee: Purdue Research Foundation, West Lafayette, IN (US)

( * ) Notice: Subject to any disclaimer, the term of this patent is extended or adjusted under 35 U.S.C. 154(b) by 750 days.

(21) Appl. No.: 16/422,549

(22) Filed: May 24, 2019

(65) Prior Publication Data

US 2019/0359324 A1 Nov. 28, 2019

Related U.S. Application Data

(60) Provisional application No. 62/677,120, filed on May 28, 2018.

(51) Int. Cl.
*B64C 17/00* (2006.01)
*B64C 11/46* (2006.01)
(Continued)

(52) U.S. Cl.
CPC .............. *B64C 17/00* (2013.01); *B64C 11/46* (2013.01); *B64C 27/32* (2013.01); *B64C 39/024* (2013.01);
(Continued)

(58) Field of Classification Search
None
See application file for complete search history.

(56) References Cited

U.S. PATENT DOCUMENTS

2016/0340028 A1* 11/2016 Datta ...................... B64C 27/08
2017/0217571 A1* 8/2017 Deng ....................... B64C 25/10

FOREIGN PATENT DOCUMENTS

JP 2018008320 A * 1/2018
WO WO-2017205997 A1 * 12/2017 ............... B64C 3/56

OTHER PUBLICATIONS

Aleksandrov et al., Energy consumption of mini UAV helicopters with different number of rotors, 11th International Symposium Topical Problems in the Field of Electrical and Power Engineering, 2012, 259-262, Tallinn University of Technology.

(Continued)

*Primary Examiner* — Maceeh Anwari
*Assistant Examiner* — Jacob Daniel Underbakke
(74) *Attorney, Agent, or Firm* — Piroozi-IP, LLC

(57) ABSTRACT

A multirotor aerial vehicle (MAV) is disclosed. The MAV includes a housing, a plurality of rotatable arms, wherein each of the plurality of rotatable arms has a proximal end coupled to the housing and a distal end configured to rotate about a vertical axis passing through the proximal end of the corresponding arm, a plurality of thrust-generating rotors, each coupled to a corresponding one of the plurality of rotatable arms at the corresponding distal end, a flight controller configured to selectively control each of the plurality of thrust-generating rotors, and a flight trim controller configured to control rotation of the plurality of rotatable arms in order to adjust the geometric center of the rotors of the MAV from a first center of gravity (CoG) associated with the MAV in an unloaded state to a second CoG associated with the MAV in a loaded state.

16 Claims, 4 Drawing Sheets

(51) Int. Cl.
    B64C 39/02    (2006.01)
    B64C 27/32    (2006.01)
(52) U.S. Cl.
    CPC .. B64C 2201/027 (2013.01); B64C 2201/108 (2013.01); B64C 2201/128 (2013.01)

(56) References Cited

OTHER PUBLICATIONS

Mellinger et al., Design, modeling, estimation and control for aerial grasping and manipulation, IEEE/RSJ International Conference on Intelligent Robots and Systems (IROS), 2011, 2668-2673, IEEE, San Francisco, CA, USA.

Xu et al., Modelling and control of a quadrotor equipped with an unbalanced load, Modelling and control of a quadrotor equipped with an unbalanced load, 2017, 784-789, IEEE, Gold Coast Convention Centre, Australia.

Ghadiok et al., Autonomous indoor aerial gripping using a quadrotor, IEEE/RSJ International Conference on ntelligent Robots and Systems (IROS), 2011,4645-4651, IEEE, San Francisco, CA, USA.

Palunko et al., Adaptive control of a quadrotor with dynamic changes in the center of gravity, Proceedings 18th IFAC World Congress, 2011, 2626-2631, International Federation of Automatic Control (IFAC), Milano, Italy.

Teppo Luukkonen, Modelling and control of quadcopter, Independent research project in applied mathematics, 2011, Espoo.

Pounds et al., Modelling and control of a large quadrotor robot, Control Engineering Practice, 2010, 691-699, vol. 18, Elsevier Ltd.

Xian et al., Nonlinear control of a quadrotor with deviated center of gravity, Journal of Dynamic Systems, Measurement, and Control, 2017, 011003-1-011003-8, vol. 139, ASME.

Amezquita-Brooks et al., Towards a standard design model for quad-rotors: A review of current models, their accuracy and a novel simplified model. Progress in Aerospace Sciences, 2017, 1-23, vol. 95, Elsevier Ltd.

Haus et al., Mathematical Modelling and Control of an Unmanned Aerial Vehicle with Moving Mass Control Concept, Journal of Intelligent & Robotic Systems, 2017, 219-246, vol. 88, Springer Science+Business Media Dordrecht.

Penkov et al., Analysis and study of the influence of the geometrical parameters of mini unmanned quad-rotor helicopters to optimise energy saving, International Journal of Automotive and Mechanical Engineering, 2017, 4731-4746, vol. 14, Universiti Malaysia Pahang Publishing, Tallinn University of Technology, Estonia.

Kamil et al., A New Model of Unmanned Aerial Vehicle Quadrotor Using The Variation in The Length of The Arm, International Conference on Artificial Life and Robotics (ICAROB), 2017, 723-726, The 2017 International Conference on Artificial Life and Robotics (ICAROB 2017), Miyazaki, Japan.

Zhao et al., The deformable quad-rotor: Design, kinematics and dynamics characterization, and flight performance validation, IEEE/RSJ International Conference on Intelligent Robots and Systems (IROS), 2017, 2391-2396, IEEE, Vancouver, BC, Canada.

Xiong et al., Optimize Energy Efficiency of Quadrotors Via Arm Rotation, Journal of Dynamic Systems, Measurement, and Control, 2019, 91002-1-91002-10, vol. 141, ASME.

Ye Bai, Control and Simulation of Morphing Quadcopter, 2017, ProQuest LLC, Saint Louis University.

Yasameen Kamil et al., A novel VAL: Quadrotor control technique for trajectory tracking based on varying the Arm's Length, ARPN Journal of Engineering and Applied Sciences, 2016, 9195-9204, vol. 11, No. 15, Asian Research Publishing Network (ARPN).

Ariyanto et al., Mathematical and physical modelling with dynamic change in the center of gravity of quadrotor, International Conference on Information Technology and Electiical Engineering (ICITEE), 2016, 1-6, Yogyakarta, Indonesia.

Rikky Ricardo Petrus Rufino Duivenvoorden, Quadrotor Control in the Presence of Unknown Mass Properties, 2016, Rikky Ricardo Petrus Rufino Duivenvoorden, University of Toronto.

Dustin A. Wallace, Dynamics and Control of a Quadrotor with Active Geometric Morphing, 2016, University of Washington.

Sanz et al., Robust control of quadrotors based on an uncertainty and disturbance estimator, Journal of Dynamic Systems, Measurement, and Control, 2016, 071006-1-071006-8, vol. 138, ASME.

Islam et al., Robust control of four-rotor unmanned aerial vehicle with disturbance uncertainty, IEEE Transactions on Industrial Electronics, 2015, 1563-1571, vol. 62, No. 3, IEEE.

Driessens et al., The triangular quadrotor: a more efficient quadrotor configuration, IEEE Transactions on Robotics, 2015, 1517-1525, vol. 31, No. 6.

Vargas et al., Dynamic modeling of a multi-rotorcraft UAS with morphing capabilities, International Conference on Unmanned Aircraft Systems (ICUAS), 2015, 963-971, IEEE, Denver, Colorado.

Avant et al., Dynamics, Hover Configurations, and Rotor Failure Restabilization of a Morphing Quadrotor, Annual American Control Conference (ACC), 2018, 4855-4862, AACC, Wisconsin Center, Milwaukee, USA.

Gabriele Barbaraci, Modeling and control of a quadrotor with variable geometry arms, Journal of Unmanned Vehicle Systems, NRC Research Press, 2015, 35-57, vol. 3, NRC Research Press.

Chovancová et al., Mathematical modelling and parameter identification of quadrotor (a survey), Procedia Engineering, 2014, 172-181, vol. 96, Elsevier Ltd.

Bergamasco et al., Identification of linear models for the dynamics of a hovering quadrotor, IEEE Transactions on Control Systems Technology, 2014, 1696-1707, vol. 2, No. 5, IEEE.

Driessens et al., Towards a more efficient quadrotor configuration, IEEE/RSJ International Conference on Intelligent Robots and Systems (IROS), 2013, 1386-1392, IEEE, Tokyo, Japan.

Aleksandrov et al., Optimal gap distance between rotors of mini quadrotor helicopter, Proceedings of the 8th DAAAM Baltic Conference, 2012, Tallinn, Estonia.

Pounds et al., Stability of small-scale UAV helicopters and quadrotors with added payload mass under PID control, Autonomous Robots, 2012, 129-142, vol. 33, Springer Science+Business Media, LLC.

Mahony et al., Multirotor Aerial Vehicles: Modeling, Estimation, and Control of Quadrotor, IEEE Robotics & Automation Magazine, 2012, 20-32, vol. 19, IEEE.

Palunko et al., Agile load transportation: Safe and efficient load manipulation with aerial robots, IEEE Robotics & Automation Magazine, 2012, 69-79, vol. 19, IEEE.

* cited by examiner

MULTIROTOR AERIAL VEHICLE WITH AUTOMATICALLY ROTATABLE ARMS

CROSS-REFERENCE TO RELATED APPLICATIONS

The present patent application is related to and claims the priority benefit of U.S. Provisional Patent Application Ser. No. 62/677,120, filed on May 28, 2018, the contents of which is hereby incorporated by reference in its entirety into the present disclosure.

TECHNICAL FIELD

The present disclosure generally relates to unmanned aerial vehicles, and more particularly, to improve dynamic performance and energy efficiency and increase the maximum sustainable payload, feasible torque and attitude in such vehicles.

BACKGROUND

This section introduces aspects that may help facilitate a better understanding of the disclosure. Accordingly, these statements are to be read in this light and are not to be understood as admissions about what is or is not prior art.

Unmanned aerial vehicles (UAVs), and particularly quadrotors (QRs), have become very popular as of late. Besides being used as radio-controlled devices for hobbyists, these UAVs now promise to be used in a large variety of applications such as surveillance, crop monitoring, and more recently promise to be used as payload transfer vehicles. In the latter application, after the QR is coupled to a payload, such as a package for delivery, the center of gravity (CoG) of the coupled QR moves away from the initial CoG of the QR which is typically located at the geometric center of the rotors of the QR. The geometric center of the rotors of a QR is defined as the geometric center of the planar geometry formed by the locations of the four rotors of the QR. Mathematically, the geometric center of a planar geometry is the arithmetic mean position of all the points in the geometry. Traditionally, QRs of the prior art are equipped with fixed arms upon each of which a rotor is mounted. Therefore, the geometric center of the rotors of a traditional QR is fixed as well. For a traditional QR, a shift of the CoG results in a bias torque generated by the resultant rotor thrust and the gravity of the QR and the payload. Such a bias torque is balanced by generating different rotor thrusts.

However, utilizing different rotor thrusts to actively compensate for a shifted CoG or the associated bias torque results in limited control of maneuvering the QR. That is, compensating the bias torque by generating different rotor thrusts reduces the dynamic performance of a QR when faced with external disturbances and increases the vibration and the power consumption of a QR. For example, if two of the four rotors of a QR are already at maximum thrust output to account for a shifted CoG or the associated bias torque, there is not much that those two rotors can do to compensate for the presence of an external disturbance such as a gust of wind.

In recent years, retailers, shipping companies and other third parties of interest have attempted to implement the use of such QRs for last-mile package delivery. Such an implementation is faced with many challenges, some of the largest of which are safety and economic value. Flight stability, power consumption and extended periods of maximum thrust output are all factors that affect the safety and economic value of using a QR to deliver a payload from one location to another, distant location.

A shifted CoG due to the QR acquiring a payload has a negative impact on the stability of the flight. Flight stability is a major concern facing the safety of the general public with regards to a QR that is attempting to deliver a package. As mentioned above, rotors already operating at maximum thrust can't do much to compensate for an external disturbance. If that external disturbance provides enough force, the thrust generated by the rotors may not be enough to keep the QR in an orientation to sustain flight. In such an instance the QR could become a major safety hazard if it is operating in a public area.

Furthermore, in a case where one or more of the four rotors are at maximum thrust to account for a shifted CoG or the associated bias torque, there is a higher chance that the rotors will fail. Failure of rotors mid-flight would result in the QR crashing which could cause damage to an attached payload and the QR itself. Most importantly, it would be dangerous for any person in the proximity of the QR when rotor failure occurs.

With regards to economic concerns, retailers and others who intend to reduce costs by using QRs to handle deliveries must account for the cost of operating and maintaining the QR. The QR offers a reduction in delivery cost that is directly related to its performance, which can be impacted by factors such as the power consumption, the reliability of packages to arrive safely, costs of maintenance, and so on. Extended use of the rotors to generate maximum thrust consumes more power, resulting in a shorter range of delivery, and requires the QR to recharge or refuel more often, resulting in fewer deliveries being made. Fewer deliveries and a higher power usage negatively impact the reduction in cost that the retailer had originally sought. Also, damage to packages resulting from an unstable flight or rotor failure would incur another cost to the retailer or shipping company.

Dealing with these concerns has been an ongoing issue for large retailers, shipping companies and other third parties of interest. Any approach that would increase the stability and reliability of the QR would have a direct impact on its safety and economic value.

Therefore, there is an unmet need for a novel approach to compensate for a shift in CoG or the associated bias torque of a QR that does not interfere with the QR's ability to manage demands for varying the thrust generated by each rotor.

SUMMARY

A multirotor aerial vehicle (MAV) is disclosed. The MAV includes a housing and a plurality of rotatable arms, each of the plurality of rotatable arms having a proximal end coupled to the housing and a distal end configured to rotate about a vertical axis passing through the proximal end of the corresponding rotatable arm. The MAV also includes a plurality of thrust-generating rotors, each coupled to a corresponding one of the plurality of rotatable arms at the corresponding distal end. The MAV also includes a flight controller configured to selectively control each of the plurality of thrust-generating rotors. Furthermore, the MAV includes a flight trim controller configured to control rotation of the plurality of rotatable arms in order to adjust the geometric center of the rotors of the MAV from a first center of gravity (CoG) associated with the MAV in an unloaded state to a second CoG associated with the MAV in a loaded state.

A method of stabilizing a multirotor aerial vehicle (MAV) is also disclosed. The method includes receiving a payload to be transported by the MAV and computing the bias torque caused by the shift of the CoG due to the eccentric payload to be transported by the MAV or other causes. The method also includes determining the target positions of the plurality of arms, wherein at least one of the plurality of arms is rotatable with respect to a vertical axis passing through a point near a proximal end of the arm. The method also includes rotating the at least one of the plurality of arms capable of rotation in order to adjust the geometric center of the rotors of the MAV from a first center of gravity (CoG) associated with the MAV in an unloaded state to a second CoG associated with the MAV in a loaded state. The method further includes applying thrusts to a plurality of rotors, each positioned at a distal end of a corresponding arm.

DETAILED DESCRIPTION

Figure 1:
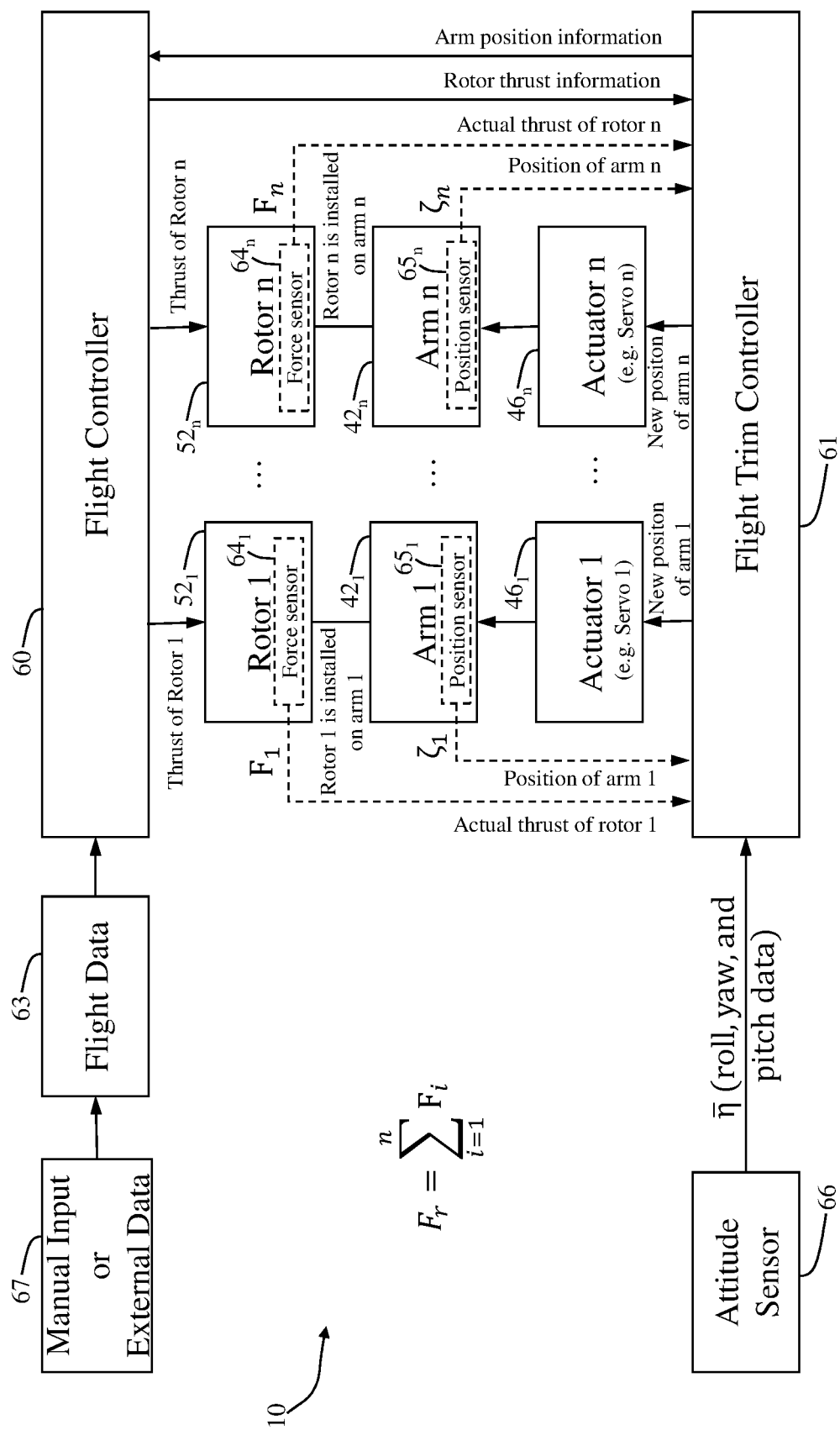
FIG. 1 is a schematic of a control scheme, depicting blocks in a system including a flight trim controller and a flight controller capable of adjusting the geometric center of the rotors of a multirotor unmanned aerial vehicle, e.g., a quadrotor (QR), according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is provided in the present disclosure to compensate for a shift in center of gravity (CoG) or an associated bias torque of a quadrotor (QR) that does not interfere with the QR's ability to manage demands for varying the thrust generated by each rotor. For generality, unmanned aerial vehicles (UAVs) are referred to as QRs or multirotor aerial vehicles (MAVs), interchangeably. However, as discussed more fully below, it is understood that more or less number of rotors than four are possible and are within the scope of this disclosure.

Referring to FIG. 1, a system 10 is provided, depicting various blocks according to the present disclosure capable of adjusting the geometric center of the rotors $152_i$ (where i is the subscript representing rotors of the physical system, e.g., rotors $152_1$, $152_2$, $152_3$, and $152_4$) of a QR 100 or 100' (shown in FIGS. 2 and 3) with an insignificant impact on thrust. The system 10 includes a Flight Controller 60 adaptable to provide general flight controls for the QR 100 or 100' (see FIGS. 2 and 3) and a Flight Trim controller 61 adaptable to provide needed controls to trim the QR 100 or 100' (see FIGS. 2 and 3). The Flight Controller 60 receives data from a block 63 identified as "Flight Data" which provides destination information, such as latitude and longitude, of the QR 100 or 100' (see FIGS. 2 and 3). This information may be obtained manually or provided as an external input as provided by the block 67. The Flight Trim controller 61 receives its input, such as roll, yaw, and pitch data, from one or more attitude sensors 66.

As provided above, the system 10 includes two controllers: 1) Flight Controller 60, and 2) Flight Trim Controller 61. While two controllers are shown, a single controller can be implemented responsible for functionalities, described herein, of each of the shown controllers. Additionally, the Flight Trim Controller 61 can be maintained separately as part of a retrofit assembly to an existing Flight Controller 60 in a conventional QR, with minimal electronic disturbances.

As mentioned above, the Flight Controller 60 receives flight data from the block 63 from a subsystem based on manual input or external data as provided in block 67. The flight data of block 63 can include origination coordinates, destination coordinates, GPS data, real-time attitude and speed requirements, and other parameters known to a person having ordinary skill in the art. The Flight Controller 60 processes the flight data of block 63 and converts that data into thrust information for each of the rotors as shown in blocks $52_i$ (where i is the subscript representing rotors of the physical system, e.g., rotors $152_1$, $152_2$, $152_3$, and $152_4$ of the QR 100 or 100' shown in FIGS. 2 and 3) which is sent to the Flight Trim Controller 61. Depending on the rotor design, the thrust information can take the form of a digital signal or an analog signal. These rotor blocks are shown as $52_1$ to $52_n$ representing rotors 1 through n. As mentioned above, n can be any integer from two to eight.

At the same time, one or more attitude sensors 66 provide attitude data including roll, yaw, and pitch to the Flight Trim Controller 61. Alternatively, the attitude data from the sensors can be received by the Flight Controller 60 and communicated to the Flight Trim Controller 61. The Flight Trim Controller 61 receives the attitude data from the one or more attitude sensors 66 as well as the rotor thrust information from the Flight Controller 60. The latter can be in the form of a bus or individual I/O communication lines between the Flight Controller 60 and Flight Trim Controller 61.

Each rotor control block 52 is coupled to a rotatable arm control block 42 (i.e., arm 1 to arm n). Each rotatable arm control block 42 is selectively configured to be rotated as discussed in greater detail below. Initially with the QR 100' (see FIG. 2) in an unloaded state (i.e., no payload attached to the QR), the QR's CoG 171' (see FIG. 2) may coincide with its geometric center 181' (see FIG. 2). However, the QR 100 (see FIG. 3) in a loaded state (i.e., based on the attachment of a payload 148 (see FIG. 3)) has a new geometric center 181 and a new CoG 171 (see FIG. 3). The new geometric center 181 is the geometric center of the planar geometry formed by the locations of the four rotors $152_i$ of the QR 100. As the rotating arms $142_i$ rotates, the rotors $152_i$ move and the position of the new geometric center 181 changes accordingly. The geometric center 181 is located in a certain area of the planar geometry formed by the locations of the four rotors $152_i$ of the QR 100. The original CoG 171' is moved to the new CoG 171 due to the acquirement of the payload 148. According to the present disclosure, the geometric center 181 should be moved to the location above the CoG 171 (see FIG. 3) by rotating the four rotating arms $142_i$ (where the subscript i represents each arm, i.e., in the case of FIG. 3, i=1, 2, 3, and 4). The line connecting the geometric center 181 and the CoG 171 (see FIG. 3) is parallel to the z axis. To that end, the Flight Trim Controller 61 can bring the geometric center 181 to the location where the CoG 171 (see FIG. 3) is projected onto the plane formed by the rotors $152_i$ of the QR 100 in a steady attitude by selectively rotating each of the rotatable arms $142_i$ (see FIGS. 2 and 3, where the subscript i represents 1-4). The Flight Trim Controller 61 selectively controls the position of each rotatable arm $142_i$ (see FIGS. 2 and 3) by controlling a corresponding actuator control block 46 which may be a system of servos (e.g., servo 1 through servo n). However, actuation is not limited to the use of servos wherein other actuation mechanisms known to a person having ordinary skill in the art are also possible. It is possible to have a smaller number of actuators than rotatable arms, by providing the appropriate linkage, known to a person having ordinary skill in the art. The signal received by the actuator control blocks $46_1$ through $46_n$ from the Flight Trim Controller 61 may be in the form of a digital signal or analog signal depending on the design of the actuators.

The Flight Trim Controller 61 provides signals indicative of arm position for each of the rotatable arms $142_i$ (see FIGS. 2 and 3) to the Flight Controller 60. This can be in the form of a bus or individual I/O communication lines between the Flight Controller 60 and Flight Trim Controller 61.

Optionally, each rotor control block $52_i$ (i.e., for rotor 1 to rotor n) may be equipped with a force sensor 64 whose data (i.e., $F_1$ to $F_n$) can be correlated to a thrust signal in communication with the Flight Trim Controller 61. These signals can be, in addition to the corresponding signals, received from the Flight Controller 60, in which case the Flight Controller 60 and Flight Trim Controller 61 may go through an initial calibration at the beginning of each power cycle, or these signals may replace the thrust information provided by the Flight Controller 60. Additionally, each rotatable arm 42 (i.e., arm 1 to arm n) can be equipped with a position sensor $65_i$ (e.g., an optical encoder) that can provide position data for the respective rotatable arm $142_i$ (see FIGS. 2 and 3), i.e., $\zeta_1$ to $\zeta_n$ as a feedback signal to the Flight Trim Controller 61. The Flight Trim Controller 61 may be configured to operate in an open-loop configuration without the position sensors $65_i$, or in a closed-loop manner using the position sensor data obtained from the position sensors $65_i$.

In the present disclosure, QRs 100 with rotatable arms are referred to as QRAs and QRs 100 with fixed arms are referred to as QFAs. Therefore, while not shown, it is possible that some of the arms are rotatable while some of the arms are fixed. Each of the rotatable arms in a QRA can selectively rotate in the x-y plane of $F_B$ within a certain range while the arms of a QFA are fixed. It should be appreciated that rotor thrust of each rotor $152_i$ (see FIGS. 2 and 3) of a QRA is normal to the x-y plane of $F_B$ which is described in more detail below.

Figure 2:
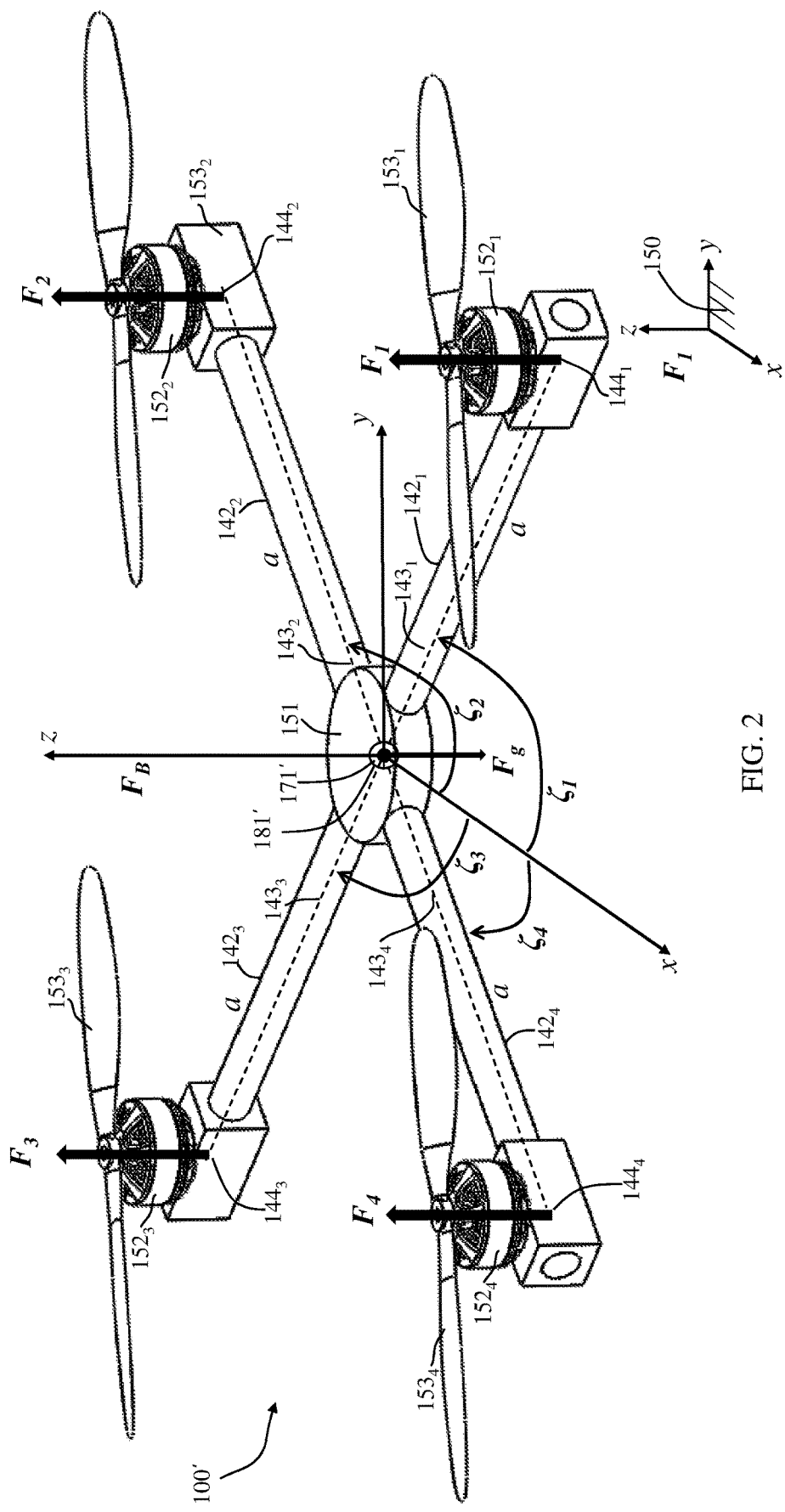
FIG. 2 is a schematic representation of a QR in an unloaded state (i.e., with no attached payload).
Figure 3:
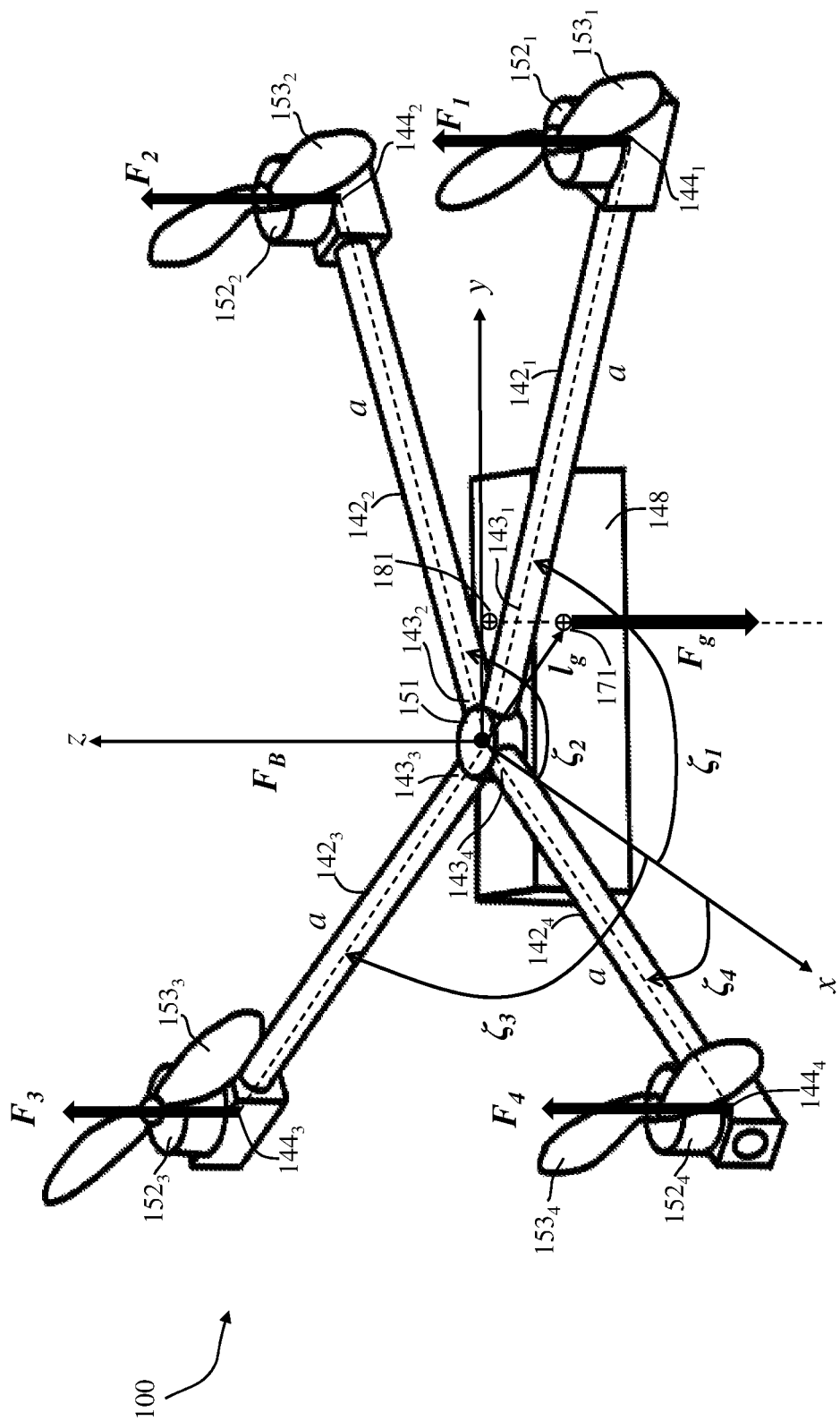
FIG. 3 is a schematic representation of the QR of FIG. 2 in a loaded state (i.e., with an attached payload).

Referring to FIGS. 2 and 3, perspective views of the QR 100 (FIG. 2 representing a QR in an unloaded state, i.e., without a payload) and QR 100' (FIG. 3 representing the QR in a loaded state, i.e., with a payload attached) are shown, respectively. The non-limiting embodiment of the QR 100 and 100' as shown in FIGS. 2 and 3 includes four rotatable arms $142_i$ ($142_1$, $142_2$, $142_3$, and $142_4$), with each starting from a housing 151 and having at its distal end ($144_1$, $144_2$, $144_3$, and $144_4$) a corresponding rotor $152_i$ ($152_1$, $152_2$, $152_3$, and $152_4$) rotating corresponding propellers $153_i$ ($153_1$, $153_2$, $153_3$, and $153_4$). The housing 151 shown in FIG. 2 is depicted as, but not limited to, having a cylindrical structure. Rotation of the rotatable arms $142_i$ is achieved through use of an actuator 46 (referenced in FIG. 1), which is controlled by the Flight Trim Controller 61. The actuator blocks $46_i$ (see FIG. 1) used may be, but not limited to, a system of servos wherein other actuation mechanisms known to a person having ordinary skill in the art are also possible, as described above. Each rotor $152_i$ generates a normal thrust indicated by $F_1$, $F_2$, $F_3$, and $F_4$. Adjustment of the geometric center of the rotors $152_i$ is accomplished by the rotation of corresponding rotatable arms $142_i$, each with associated rotors $152_i$. The rotation of the rotatable arms $142_i$ occurs, as discussed above, by the combination of blocks $52_1$ (see FIG. 1, titled Rotor 1 which includes force sensor $64_1$), $42_1$ (titled Arm 1 which includes position sensor $65_1$), and $46_1$ (titled Actuator 1) for a rotatable arm $142_1$ (see FIGS. 2 and 3) . . . and the combination of blocks $52_n$ (titled Rotor n which includes force sensor $64_n$), $42_n$ (titled Arm n which includes position sensor $65_n$), and $46_n$ (titled Actuator n) for a rotatable arm $142_n$ (see FIGS. 2 and 3, where in the case of FIG. 2 n=4). As discussed above, the rotatable arms $142_i$ are rotated about the housing by angles $\zeta_1$, $\zeta_2$, $\zeta_3$, and $\zeta_4$, respectively, by use of actuators (e.g., servo motors) disposed in the housing 151.

As further discussed above, an important goal of the novel arrangement disclosed herein is to adjust the geometric center of the rotors $152_i$ of the QR 100 to coincide with a shift in the location of the CoG 171 of the QR 100 upon acquiring a payload 148. Any shift of the CoG 171 from the existing geometric center of the rotors $152_i$ of the QR 100 results in a CoG offset. For example, a CoG offset can occur when a first CoG associated with the QR 100 in an unloaded state, is shifted to a second CoG associated with the QR 100 in a loaded state (e.g. when a package or payload 148 is loaded). When the geometric center of the rotors $152_i$ of the QR 100 is changed to coincide to the projection of the CoG 171 on the plane formed by the rotors $152_i$, the CoG offset is zero and thus, there is no bias torque caused by the CoG offset. While a shift in the CoG can create an associated bias torque, other external factors (e.g., a steady prevailing wind, or a sudden gust) can also create a bias torque. The novel approach presented here is adaptable to account for bias torque resulting from a shifting CoG as well as those which are caused by the aforementioned external factors.

Thus, a novel approach is disclosed to compensate for a shift in the CoG 171 or a change in bias torque resulting from the shift in CoG or from external factors. This novel approach does not interfere with the ability of the QR 100 to manage demands for varying the thrust generated by rotors $152_i$ of the QR 100 (see FIGS. 2 and 3). While the present disclosure is derived based on unmanned aerial vehicles (UAVs) with four rotors $152_1$, $152_2$, $152_3$, and $152_4$ (see FIGS. 2 and 3), it should be appreciated that the concepts discussed herein are applicable to, and thus within the scope of the present disclosure, UAVs with more or less than four rotors (e.g., as few as two rotors and as many as eight rotors) are within the scope of the present disclosure.

A non-zero CoG offset is just one of many sources that can contribute to the bias torque. Other sources can be a manipulation force (when a robot manipulator (not shown) installed on the QR 100 interacts with the environment), aerodynamic drag (caused by the rotation of propellers $153_i$, and so on. Propellers $153_i$ depicted in FIG. 2, are of a common dual-blade design, however the present disclosure is not limited to the use of such propellers $153_i$ where alternate propeller designs known to a person having ordinary skill in the art may be used.

While the present disclosure focuses on trimming out the bias torque caused by the CoG offset, it should be appreciated, as discussed above, that the same arrangement can be applied to a multitude of causes that generate unwanted bias torque.

If there is no bias torque (caused by a non-zero CoG offset or any other source), all rotor thrusts should be about the same when the QR 100 is in steady state operations (e.g., steadily hovering or low-speed uniform motion). In such a case, the QR has the best performance.

Once an eccentric payload 148 is loaded on the QR 100, the CoG 171 of the QR 100 (together with the payload 148) is fixed but shifts from the geometric center of the rotors $152_i$ of the QR 100 to a second CoG causing a CoG offset. When this occurs, the geometry of the QR 100, defined by the locations of the four rotors $152_i$, changes with the rotation of the rotatable arms $142_i$. Therefore, the arrangement disclosed herein is designed to adjust the geometric center of the rotors $152_i$ of the QR 100 (via rotatable arms $142_i$) such that the geometric center of the rotors $152_i$ of the QR 100 can be moved to where a second CoG is projected on the plane formed by the four rotors $152_i$ after the QR 100 has acquired a payload 48. If there is a bias torque (caused by whatever source), rotor thrusts vary in order to fight the bias torque, which reduces the performance of the QR 100. In this case, the geometric center of the rotors $152_i$ of the QR 100 should be adjusted based on the teachings of the present disclosure by rotating the rotatable arms 42 (i.e., by changing the positions of the rotors 52 and associated thrusts). Rotation of the rotatable arms 142 will have an impact on rotor thrusts, namely, by rotating the rotatable arms 142 all rotor thrusts tend to converge to the same thrust output (¼ of the total weight of the quadrotor 100, the payload 148, and/or other external forces exerted on the quadrotor 100).

The equations and vectors detailed below are set forth in a Cartesian coordinate system. However, cylindrical and spherical coordinate systems may be used to substitute the existing vector notation where appropriate. Such substitution can be made by methods known to those having ordinary skill in the art.

In order for the Flight Trim Controller 61 to control each of the rotatable arms 42 to a selective position, it needs 1) a dynamics model of a QR 100 with the bias torque caused by the CoG offset taken into account, and 2) a flight trim system using the dynamics model to trim out the bias torque caused by the CoG offset. To establish the model, the angular positions of $\zeta_1$, $\zeta_2$, $\zeta_3$, and $\zeta_4$, with each rotatable arm $142_i$ terminating with a rotor $152_i$ having a thrust force $F_1$, $F_2$, $F_3$, and $F_4$, respectively, are used. While the QR 100 shown in FIG. 2 is of a QRA variety (i.e., rotatable arms with selective angular position), in a QFA variety, the angle of each arm of the QR is fixed as $\zeta_{f1}$, $\zeta_{f2}$, $\zeta_{f3}$, and $\zeta_{f4}$, respectively. Therefore, while $\zeta_i$ (i=1, 2, 3, 4) are variables, $\zeta_{fi}$ (i=1, 2, 3, 4) are constants ($[\zeta_{f1}\ \zeta_{f2}\ \zeta_{f3}\ \zeta_{f4}]^T = [45°\ 135°\ -135°\ -45°]^T$). In FIG. 2 or 3, each of the rotatable arms $142_i$ has a length "a" which is defined as the distance between a vertical axis running through the center of each rotor $152_i$ to the z-axis, where a can be different for each rotatable arm $142_i$. The CoG 171 is defined by $l_g = [l_x\ l_y\ l_z]^T$. The force of gravity operating on the QR 100 is $F_g = [F_x\ F_y\ F_z]^T$ which has a magnitude mg where m is the total mass of the QR 100 plus payload 48 and g is the gravitational constant.

The bias torque $\tau_g$ is generally expressed as $$\tau_g = l_g \times F_g \text{ or } \begin{bmatrix} \tau_{gx} \\ \tau_{gy} \\ \tau_{gz} \end{bmatrix} = \begin{bmatrix} l_y F_z - l_z F_y \\ l_z F_x - l_x F_z \\ l_x F_y - l_y F_x \end{bmatrix} \quad (1)$$

The rotor thrust $F_i$ (i=1, 2, 3, 4), the magnitude of the total thrust $F_r$, and the total torque generated by all rotor thrust $\tau_r$, denoted by $\tau_r = [\tau_{rx}\ \tau_{ry}\ \tau_{rz}]^T$, have the following relationship:

$$\begin{bmatrix} F_1 \\ F_2 \\ F_3 \\ F_4 \end{bmatrix} = R \begin{bmatrix} \tau_{rx} \\ \tau_{ry} \\ \tau_{rz} \\ F_r \end{bmatrix} \quad (2)$$

where R is the rotation matrix 267 defined as provided below:

$$R = \begin{bmatrix} a\sin\zeta_1 & a\sin\zeta_2 & a\sin\zeta_3 & a\sin\zeta_4 \\ -a\cos\zeta_1 & -a\cos\zeta_2 & -a\cos\zeta_3 & -a\cos\zeta_4 \\ -\frac{\tau_{d1}}{F_1} & -\frac{\tau_{d2}}{F_2} & -\frac{\tau_{d3}}{F_3} & -\frac{\tau_{d4}}{F_4} \\ 1 & 1 & 1 & 1 \end{bmatrix}^{-1} \quad (3)$$

where $\tau_{di}$ (i=1, 2, 3, 4) represents the aerodynamic drag of the ith rotor $152_i$ and $\tau_{di}$ is proportional to the thrust ($F_i$) of the ith rotor $152_i$. A constant of proportionality between $\tau_{di}$ and $F_i$ is about 0.02.

The angular positions of each rotatable arm $142_i$ (i.e., $\zeta_1$, $\zeta_2$, $\zeta_3$, and $\zeta_4$) can be solved by satisfying the two following equations.

$$\begin{cases} \tau_{gx} + a\sum_{i=1}^{4} \sin\zeta_i F_i = 0 & (4) \\ \tau_{gy} + a\sum_{i=1}^{4} \cos\zeta_i F_i = 0 & (5) \end{cases}$$

Here there are four unknowns (i.e., $\zeta_1$, $\zeta_2$, $\zeta_3$, and $\zeta_4$) and two equations (4) and (5). Therefore, one can have infinite sets of solutions. In order to obtain a unique solution, an objective function is introduced $$f(\zeta_n) = \sum_{i=1}^{4} |\zeta_i - \zeta_{fi}| \quad (6)$$

to further constrain the solution, where $\zeta_{fi}$ (i=1, 2, 3, 4) represents the arm-associated angle of the ith arm of a QFA at $[\zeta_{f1}\ \zeta_{f2}\ \zeta_{f3}\ \zeta_{f4}]^T = [45°\ 135°\ -135°\ -45°]^T$.

With the objective function (6) achieving its minimum, the total change of arm-associated angles of the proposed QR 100 from the corresponding QFA's constant arm-associated angles is the least. It should be appreciated that the above objective function (6) is just an example. One can come up with other constraints to obtain a unique solution of the arm-associated angles.

The schematic depicts the CoG 171 shifted from the origin of the coordinate axis to a location defined by coordinates $l_g=[l_x\ l_y\ l_z]^T$ which is defined above. The plane in which all four of the rotatable arms $142_i$ rotate within is the x-y plane of $F_B$. The vertical axis with which the rotatable arms $142_i$ rotate about is normal to the x-y plane of $F_B$. Rotor thrusts $F_1$, $F_2$, $F_3$, and $F_4$ are individually generated by the corresponding rotors $152_i$ and are shown normal to the x-y plane of $F_B$. Rotor thrusts need not be equal.

Figure 4:
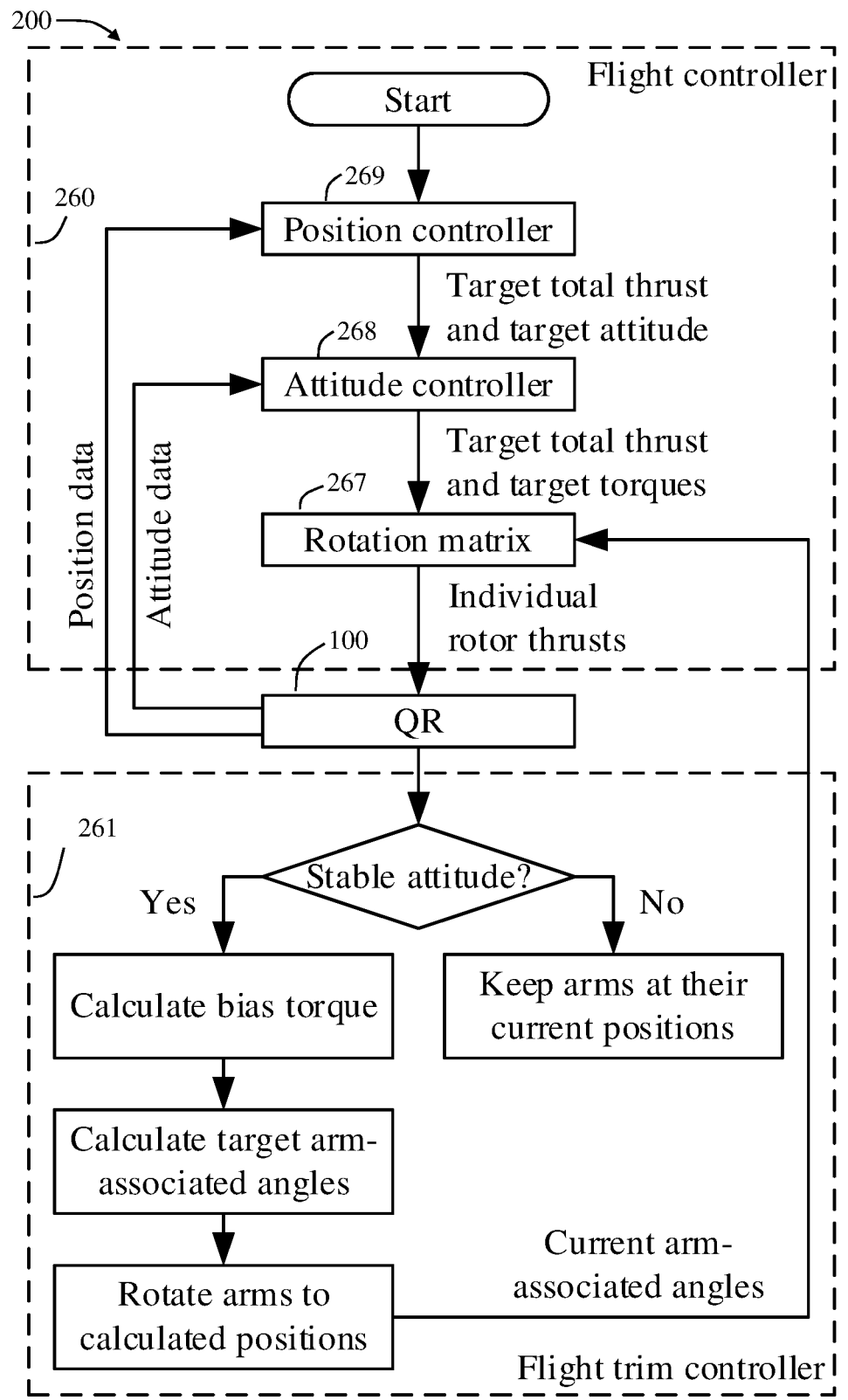
FIG. 4 is an action flowchart provided to explain the actions of the flight trim controller and the flight controller of FIG. 1.

With reference to FIG. 4, a flowchart 200 is provided to explain the actions of the Flight Trim Controller 261 (same as the Flight Trim Controller 61 of FIG. 1) as well as the Flight Controller 260 (same as the Flight Controller 60 of FIG. 1), reference to both of which were made in FIG. 1. A position controller 269 and an attitude controller 268 of a QR 100 which has rotatable arms $142_i$, according to FIG. 3, is also shown in FIG. 4.

Initially the Flight Controller 260 receives flight data from a subsystem based on manual input or external data which can include attitude and speed requirements as referenced in FIG. 1. The flight data is then processed and converted into a target total thrust and target attitude which is controlled by the position controller 269. The target total thrust and target attitude are sent to the attitude controller 268, which then determines target torques. The target torques and target total thrust are mapped to the target individual rotor thrusts using the rotation matrix 267.

The stability is determined if the absolute value of the angular velocity of the QR 100 is less than a predetermined threshold. Depending on applications, a stable attitude may be defined based on different criteria (e.g., when the attitude error, angular velocity, and angular acceleration of the QR 100 are less than specific thresholds).

When the attitude of the QR 100 is unstable (i.e., the angular velocity of the QR 100 is greater than a predetermined threshold), the Flight Trim Controller 261 keeps the rotatable arms $142_i$ at their current position. The reason for this approach is that it will become exceedingly complex to adjust the position of the rotatable arms $142_i$ when the QR 100 is unstable. If the Flight Trim Controller 261 determines the QR 100 is stable (i.e., the angular velocity of the QR 100 is equal or less than a predetermined threshold), then it calculates the bias torque as provided above. Once the bias torque has been calculated, the Flight Trim Controller 261 calculates the target arm-associated angles based on the calculated bias torque, as provided above. Once the target positions of the rotatable arms $142_i$ have been calculated, the Flight Trim Controller 261 activates the associated actuators (e.g., servo 1 to servo n in FIG. 1) to rotate all rotatable arms $142_i$ to new positions defined by the calculated target arm-associated angles. Based on the current arm-associated angles of the QR 100, the rotation matrix 267 is updated.

The current position and attitude data of the QR 100 are then fed back to the respective position controller 269 and attitude controller 268 to transform the target total thrust and the target torques about three axes x, y, and z to four target individual rotor thrusts using the newly updated rotation matrix 267 to control the position and attitude of the QR 100 in three-dimensional space.

Those having ordinary skill in the art will recognize that numerous modifications can be made to the specific implementations described above. The implementations should not be limited to the particular limitations described. Other implementations may be possible.

The invention claimed is:

1. A multirotor aerial vehicle (MAV), comprising:
a housing;
a plurality of arms, each of the plurality of arms having a proximal end coupled to the housing and a distal end, and at least one is configured to rotate about a vertical axis passing through the proximal end of the corresponding arm;
a plurality of thrust-generating rotors, each coupled to a corresponding one of the plurality of arms at the corresponding distal end;
a flight controller configured to selectively control each of the plurality of thrust-generating rotors; and
a flight trim controller configured to control rotation of at least one of the plurality of arms in order to adjust the geometric center of the rotors of the MAV from a first center of gravity (CoG) associated with the MAV in an unloaded state to a second CoG associated with the MAV in a loaded state,
wherein each of the plurality of arms is rotatable, and
where angular positions of the plurality of arms are $\zeta_1$, $\zeta_2$, $\zeta_3$, and $\zeta_4$ when the plurality of arms includes four arms capable of rotation, where $\zeta_1$, $\zeta_2$, $\zeta_3$, and $\zeta_4$ are calculated by determining a bias torque ($\tau_g$) as a torque resulting from shifting of the first CoG to the second CoG, where $\tau_g$ is defined as $$\tau_g = l_g \times F_g \text{ or } \begin{bmatrix} \tau_{gx} \\ \tau_{gy} \\ \tau_{gz} \end{bmatrix} = \begin{bmatrix} l_y F_z - l_z F_y \\ l_z F_x - l_x F_z \\ l_x F_y - l_y F_x \end{bmatrix},$$

where $l_g$ represents the location of the CoG defined by $[l_x\ l_y\ l_z]^T$, and
gravity of the MAV is $F_g$ defined by $[F_x\ F_y\ F_z]^T$ which has a magnitude mg where m is the total mass of the MAV plus a payload and g is the gravitational constant,
where rotor thrust $F_i$ (i=1, 2, 3, 4), the magnitude of the total thrust $F_r$, and the total torque generated by all rotor thrust $\tau_r$, are governed by:

$$\begin{bmatrix} F_1 \\ F_2 \\ F_3 \\ F_4 \end{bmatrix} = R \begin{bmatrix} \tau_{rx} \\ \tau_{ry} \\ \tau_{rz} \\ F_r \end{bmatrix}$$

where R is a rotation matrix defined as $$R = \begin{bmatrix} a\sin\zeta_1 & a\sin\zeta_2 & a\sin\zeta_3 & a\sin\zeta_4 \\ a\cos\zeta_1 & a\cos\zeta_2 & a\cos\zeta_3 & a\cos\zeta_4 \\ -\dfrac{\tau_{d1}}{F_1} & -\dfrac{\tau_{d2}}{F_2} & -\dfrac{\tau_{d3}}{F_3} & -\dfrac{\tau_{d4}}{F_4} \\ 1 & 1 & 1 & 1 \end{bmatrix}^{-1}$$

where $\tau_{di}$ (i=1, 2, 3, 4) represents the aerodynamic drag of the ith rotor, and
$\tau_{di}$ is proportional to thrust of the ith rotor ($F_i$),
angular positions of all four arms ($\zeta_1$, $\zeta_2$, $\zeta_3$, and $\zeta_4$) can be solved by satisfying:

$$\begin{cases} \tau_{gx} + a\sum_{i=1}^{4} \sin\zeta_i F_i = 0 \\ \tau_{gy} + a\sum_{i=1}^{4} \cos\zeta_i F_i = 0 \end{cases}$$

with an objective function being minimized.

2. The MAV of claim 1, wherein the at least one of the plurality of arms capable of rotating is actuated by an actuator.

3. The MAV of claim 2, wherein the actuator is a servo.

4. The MAV of claim 1, wherein each of the plurality of arms is actuated by an actuator.

5. The MAV of claim 4, wherein each of the actuators is a servo.

6. The MAV of claim 1, further comprising an attitude sensor to determine attitude parameters of the MAV, including roll, yaw, and pitch.

7. The MAV of claim 1, wherein the objective function is $f(\zeta_n) = \sum_{i=1}^{4} |\zeta_i - \zeta_{fi}|$, where $\zeta_{fi}$ (i=1, 2, 3, 4) represents the arm-associated angle of the ith arm of a conventional QR whose arms are fixed at $[\zeta_{f1} \; \zeta_{f2} \; \zeta_{f3} \; \zeta_{f4}]^T = [45° \; 135° \; -135° \; -45°]^T$.

8. The MAV of claim 1, wherein a constant of proportionality between $\tau_{di}$ and $F_i$ is between 0.018 and 0.022.

9. A method of stabilizing a multirotor aerial vehicle (MAV), comprising:
receiving a payload to be transported by the MAV;
determining the bias torque caused by the shift of the CoG due to the eccentric payload to be transported by the MAV;
determining the target positions of at least one of the plurality of arms capable of rotating with respect to a vertical axis passing through a point near a proximal end of the arm;
rotating the at least one of the plurality of arms capable of rotating in order to adjust the geometric center of the rotors of the MAV from a first center of gravity (CoG) associated with the MAV in an unloaded state to a second CoG associated with the MAV in a loaded state;
applying thrusts to a plurality of rotors, each positioned at a distal end of a corresponding arm,
wherein each of the plurality of arms is rotatable, and
where angular positions of the plurality of arms are $\zeta_1$, $\zeta_2$, $\zeta_3$, and $\zeta_4$ when the plurality of arms includes four arms capable of rotation, where $\zeta_1$, $\zeta_2$, $\zeta_3$, and $\zeta_4$ are calculated by determining a bias torque ($\tau_g$) as a torque resulting from shifting of the first CoG to the second CoG, where $\tau_g$ is defined as $$\tau_g = l_g \times F_g \text{ or } \begin{bmatrix} \tau_{gx} \\ \tau_{gy} \\ \tau_{gz} \end{bmatrix} = \begin{bmatrix} l_y F_z - l_z F_y \\ l_z F_x - l_x F_z \\ l_x F_y - l_y F_x \end{bmatrix},$$

where $l_g$ represents the location of the CoG defined by $[l_x \; l_y \; l_z]^T$, and gravity of the MAV is $F_g$ defined by $[F_x \; F_y \; F_z]^T$ which has a magnitude mg where m is the total mass of the MAV plus a payload and g is the gravitational constant, where rotor thrust $F_i$ (i=1, 2, 3, 4), the magnitude of the total thrust $F_r$, and the total torque generated by all rotor thrust $\tau_r$, denoted by $\tau_r = [\tau_{rx} \; \tau_{ry} \; \tau_{rz}]^T$, have the following relationship:

$$\begin{bmatrix} F_1 \\ F_2 \\ F_3 \\ F_4 \end{bmatrix} = R \begin{bmatrix} \tau_{rx} \\ \tau_{ry} \\ \tau_{rz} \\ F_r \end{bmatrix}$$

where R is a rotation matrix defined as $$R = \begin{bmatrix} a\sin\zeta_1 & a\sin\zeta_2 & a\sin\zeta_3 & a\sin\zeta_4 \\ a\cos\zeta_1 & a\cos\zeta_2 & a\cos\zeta_3 & a\cos\zeta_4 \\ -\dfrac{\tau_{d1}}{F_1} & -\dfrac{\tau_{d2}}{F_2} & -\dfrac{\tau_{d3}}{F_3} & -\dfrac{\tau_{d4}}{F_4} \\ 1 & 1 & 1 & 1 \end{bmatrix}^{-1}$$

where $\tau_{di}$ (i=1, 2, 3, 4) represents the aerodynamic drag of the ith rotor, and $\tau_{di}$ is proportional to thrust of the ith rotor ($F_i$), angular positions of all four arms ($\zeta_1$, $\zeta_2$, $\zeta_3$, and $\zeta_4$) can be solved by satisfying:

$$\begin{cases} \tau_{gx} + a\sum_{i=1}^{4} \sin\zeta_i F_i = 0 \\ \tau_{gy} + a\sum_{i=1}^{4} \cos\zeta_i F_i = 0 \end{cases}$$

with an objective function being minimized.

10. The method of claim 9, wherein the at least one of the plurality of arms capable of rotating is actuated by an actuator.

11. The method of claim 10, wherein the actuator is a servo.

12. The method of claim 9, wherein each of the plurality of arms is actuated by an actuator.

13. The method of claim 12, wherein each of the actuators is a servo.

14. The method of claim 9, further comprising
determining attitude parameters of the MAV, including roll, yaw, and pitch.

15. The method of claim 9, wherein the objective function is $f(\zeta_n) = \sum_{i=1}^{4} |\zeta_i - \zeta_{f1}|$, where $\zeta_{fi}$ (i=1, 2, 3, 4) represents the arm-associated angle of the ith arm of a conventional QR whose arms are fixed at $[\zeta_{f1} \; \zeta_{f2} \; \zeta_{f3} \; \zeta_{f4}]^T = [45° \; 135° \; -135° \; -45°]^T$.

16. The method of claim 9, wherein a constant of proportionality between $\tau_{di}$ and $F_i$ is between 0.018 and 0.022.

* * * * *